United States Patent [19]
Sheng

[11] Patent Number: 5,801,851
[45] Date of Patent: Sep. 1, 1998

[54] FLAT BED IMAGE SCANNER

[75] Inventor: Thomas Sheng, Hsin-Chu, Taiwan

[73] Assignee: Avision Inc., Hsin-Chu, Taiwan

[21] Appl. No.: 705,170

[22] Filed: Aug. 29, 1996

[51] Int. Cl.⁶ .................................................. H04N 1/04
[52] U.S. Cl. ........................... 358/497; 358/494; 358/474
[58] Field of Search ................................ 358/497, 494,
358/474, 483, 482, 471; 250/208.1, 235,
236; H04N 1/04

[56] References Cited

U.S. PATENT DOCUMENTS

| | | | |
|---|---|---|---|
| 4,989,099 | 1/1991 | Koshiyouji et al. | 358/497 |
| 5,113,268 | 5/1992 | Yoshida et al. | 358/497 |
| 5,251,072 | 10/1993 | Fukuoka et al. | 358/497 |
| 5,610,731 | 3/1997 | Itoh | 358/497 |

*Primary Examiner*—Edward L. Coles
*Assistant Examiner*—Cheukfan Lee
*Attorney, Agent, or Firm*—H. C. Lin

[57] ABSTRACT

A flat bed image scanner uses a contact image sensor to scan a document. The distance between the contact image sensor and the glass window, over which the document is placed, is minimized and held constant by inserting a lubricating element between the contact image sensor and the glass window. The lubricating element may comprise two pads placed at the two ends of the contact image sensor. The lubricating element can also be integrated structurally with the contact image sensor. The material of the lubricating element can be nylon or some other kinds of plastic. The lubricating element may also comprise two rollers placed at the two ends of the contact image sensor.

8 Claims, 3 Drawing Sheets

FLAT BED IMAGE SCANNER

BACKGROUND OF THE INVENTION

This invention relates to image scanners for providing document and picture information to computers, in particular to flat bad image scanners.

A flat bed image scanner is widely used today as a periphery equipment for scanning documents, books and pictures and for furnishing the scanned information to a computer to be processed. However, traditional flat bed image scanner leaves much to be desired in terms of cost and volume. In other words, it is desirable to develop a smaller and less costly flat bed image scanner.

FIG. 1 shows the structure of a conventional flat bad image scanner, which includes an image reading sensor 11c, a glass window 5, a sliding guide 7, a frame 12, driving mechanism (not shown) and image processing circuit (not shown). The principle of operation is as follows:

A document or picture 13 is placed over a window 5. The image 6 is irradiated with a light source 11a which is mounted on an optical carriage 11. The reflected light L passes through a group of reflecting mirrors 111, 112, 113 and lens 11b, and impinges on an image sensor 11c. Signals sensed by the sensor 11c are processed by electronic circuits (not shown) to be digitized. After the sensor 11c completes scanning the signals from one row or one area, a translating mechanism (not shown) moves the carriage 11 along the guide 7 to a next scanning position. The carriage 11 is held in place by a flange 11d which wraps around the guide 7. This scanning continues until complete image information is read.

The biggest drawback of such a carriage 11 containing the light source 11a, the reflecting mirrors 111, 112, 113, the sensors 11c and the flange 11d, lies in its bulkiness and the long light path between the image appearing at position 6 and the reflected image appearing at the sensor 11c. Take a standard size A4 paper, the distance between position 6 and the sensor 11c is more than 26 cm. In a conventional "flat bed image scanner" with three reflecting mirrors, the optical carriage has a cross-sectional area of approximately 9 cm×6 cm.

It is desirable to reduce the size, the power consumption and the cost of a flat bed image scanner. One approach to overcome the problem is to forego the mirror and lens system as the basic element and use a "Contact Image Sensor" CIS to construct a flat bed image scanner. The flat bed image scanner can achieve small size. The contact image sensor used in the present invention as shown in FIG. 2 measures only 2 cm×2 cm approximately, containing a light source 1a, a focusing lens 1b. an image sensor 1c, a dust shielding window 1d, and a frame 1e. Position 6a is where an object is scanned. However, the contact image sensor has a drawback in that the depth of focus is very short, only 0.3 mm in depth. In other words, if position 6a is off by 0.3 mm upwards or downwards, the image becomes fuzzy. On the other hand, the traditional optical system 11 shown in FIG. 1 has a depth of focus as deep as 5 mm.

Thus, it is necessary to overcome the problem of shallow depth of focus for a flat bed image scanner. The traditional optical system shown in FIG. 1 cannot be used directly for a contact image sensor, because when a contact image sensor rides on a track to travel, it is difficult to maintain an error of less than 0.3 mm between the object and the contact image sensor. Any fluctuation in mechanical dimension or change in temperature can cause deformation in material and renders mass production difficult.

SUMMARY

An object of this invention is to devise a structure adapted to the shallow depth of focus of a contact image sensor for use in a flat bed image scanner. Another object of this invention is to reduce the optical path in a flat bed image scanner. Still another object of this invention is to reduce the cross-sectional area of a flat bed image scanner.

These objects are achieved in this invention by using a novel structure for the contact image sensor. The contact image sensor is pressed against the glass window by a spring, so that the sensor can slide in intimate contact with the glass window. Thus, the distance between the scanned object and the contact image sensor can be held within an error 0.3 mm. Any error in mechanical precision or due to temperature fluctuation cannot adversely affect the scanning quality of the image scanner.

DETAILED DESCRIPTION OF THE PREFERRED EMBODIMENT

Figure 1:
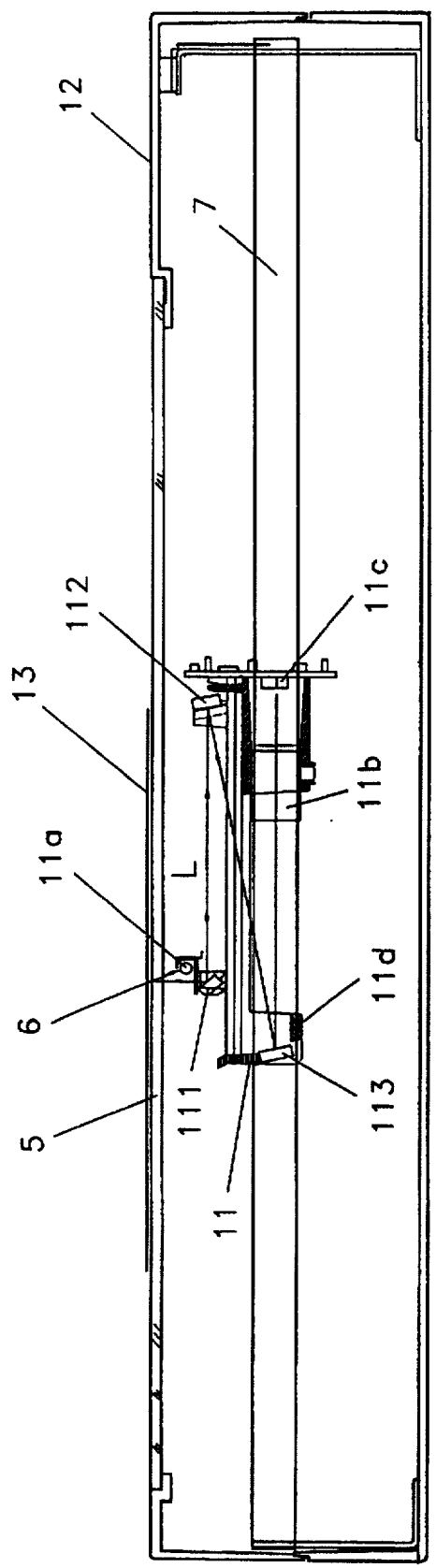
FIG. 1 shows the structure of a conventional flat bad image scanner.
Figure 2:
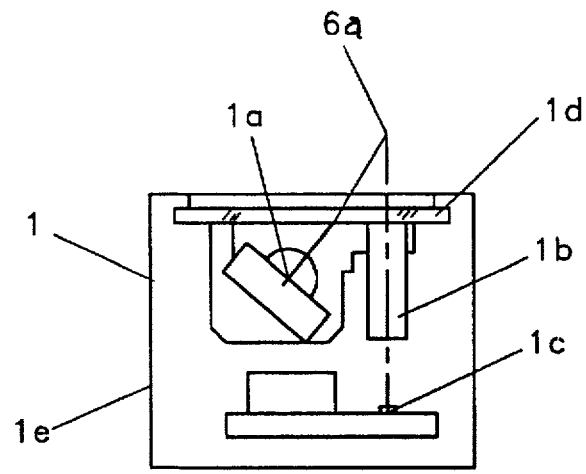
FIG. 2 shows the cross-section of a contact image sensor used in the present invention.
Figure 3:
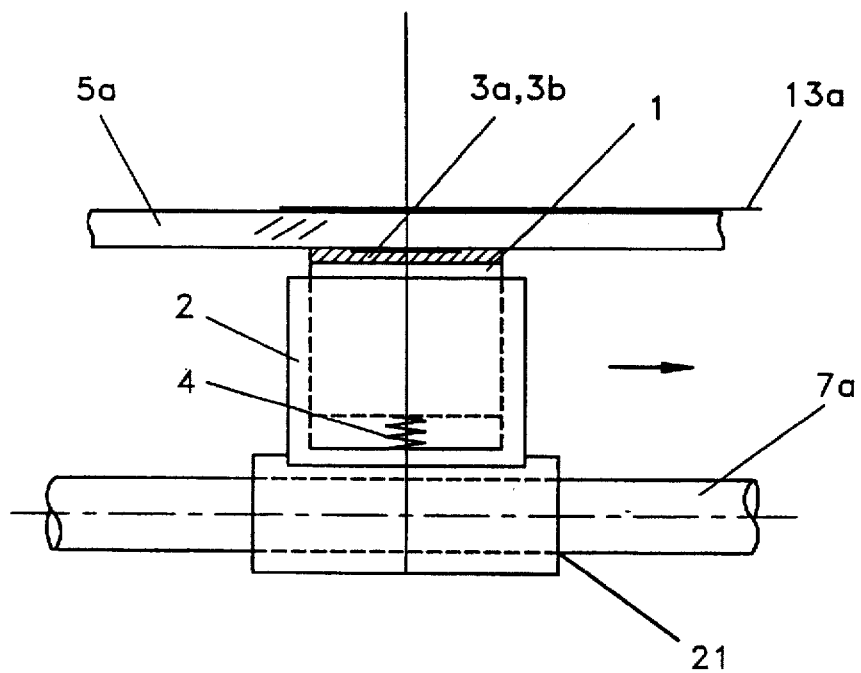
FIG. 3 shows the reading head of the present invention.

FIG. 3 shows the structure of the optical reading mechanism for the contact image sensor based on the present invention. A contact image sensor I is recessed in a nest 2. An elastic element 4 is used to push the contact image sensor I intimately against a glass window 5a. This elastic element 4 can be spiral spring or a leave-shaped spring such as a C-shaped spring or S-shaped spring. A lubricating element 3a, 3b is inserted between the contact image sensor 1 and the glass window 5a to reduce friction so that the contact image sensor can intimately glide along the surface of the glass window 5a. The lubricating element is composed of material with low coefficient of friction, such as nylon or certain engineering plastic material. Such lubricating element 3a, 3b can also be integrated with the frame of the contact image sensor.

The sliding action between the contact image sensor 1 and the glass window 5a can also be obtained by installing rollers at the two ends of the contact image sensor 5a instead of using the lubricating media 3a, 3b.

The bottom of the nest 2 is attached to sliding sleeve 21. This sliding sleeve is mounted over a track 7a, so that the nest can slide along the track 7a and function to scan any document 13a placed above the window 5a.

Figure 4:
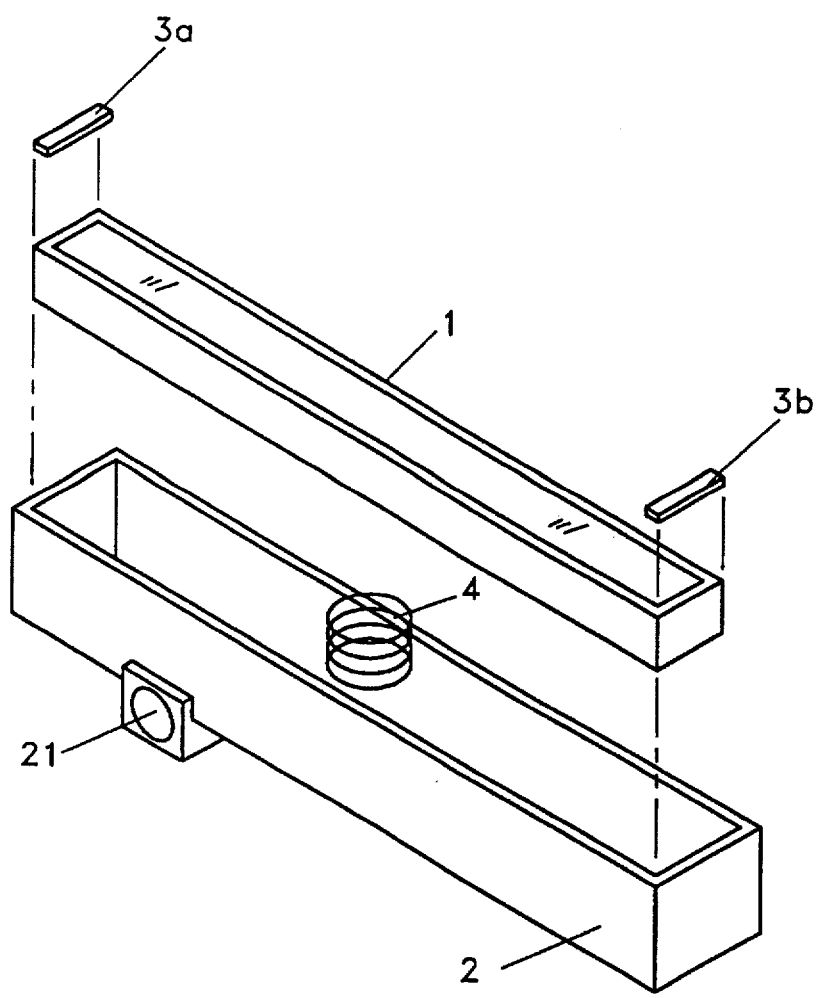
FIG. 4 shows the different components parts of the reading head.

FIG. 4 shows the individual component parts of the contact image sensor based on one embodiment of this invention. The two lubricating elements 3a and 3b are each placed at two respective ends of the contact image sensor 1. An elastic element 4 is inserted between the contact image sensor 1 and the nest 2, such that the contact image sensor is in intimate contact with one side of the window 5a. The bottom of the nest of 2 is attached to a sleeve 21, which can slide along the track 7a to function as a scanner.

With this structure, a thinner and less bulky flat bed scanner is obtained. Although the foregoing description illustrates only one preferred embodiment of a flat bed scanner based on the present invention, the invention is not limited to this particular structure. Any other structures using the spirit and principle of placing the contact image sensor in intimate contact with the document window are all within the scope of this invention.

What is claimed is:

1. A flat bed image scanner for scanning a document to obtain data for digital processing comprising:

a glass window for placing said document;

a contact image sensor for scanning said document;

two durable lubricating plastic pads placed at two ends of said contact image sensor between said contact image sensor and said glass window to reduce friction when said contact image sensor slides along said glass window;

a nest for recessing said contact image sensor; and an elastic element placed in said nest so the contact image sensor can scan said document.

2. A flat bed image scanner as described in claim 1, wherein said lubricating material comprises nylon.

3. A flat bed image scanner as described in claim 1, wherein said elastic element is a spiral spring.

4. A flat bed image scanner as described in claim 1 wherein said elastic element is a leaf-shaped spring.

5. A flat bed image scanner as described in claim 4, wherein said elastic element is of C-shape.

6. A flat bed image scanner as described in claim 4, wherein said elastic element is of S-shape.

7. A flat bed image scanner as described in claim 1, wherein said sliding mechanism comprises a sleeve attached to the bottom of said nest, and a track over which said sleeve can slide.

8. A flat bed image scanner as described in claim 1, wherein the thickness of said plastic pad is less than 0.3 mm.

* * * * *